US012668114B2

(12) United States Patent
Zhang et al.

(10) Patent No.: US 12,668,114 B2
(45) Date of Patent: Jun. 30, 2026

(54) BATTERY PACK TRAY AND ELECTRIC VEHICLE

(71) Applicants: AULTON NEW ENERGY AUTOMOBILE TECHNOLOGY CO., LTD., Guangzhou (CN); SHANGHAI DIANBA NEW ENERGY TECHNOLOGY CO., LTD., Shanghai (CN)

(72) Inventors: Jianping Zhang, Shanghai (CN); Danliang Qiu, Shanghai (CN); Meng Liu, Shanghai (CN); Xinrui Yu, Shanghai (CN)

(73) Assignees: AULTON NEW ENERGY AUTOMOBILE TECHNOLOGY CO., LTD., Guangzhou (CN); SHANGHAI DIANBA NEW ENERGY TECHNOLOGY CO., LTD., Shanghai (CN)

( * ) Notice: Subject to any disclaimer, the term of this patent is extended or adjusted under 35 U.S.C. 154(b) by 380 days.

(21) Appl. No.: 18/573,629

(22) PCT Filed: Nov. 30, 2022

(86) PCT No.: PCT/CN2022/135628
§ 371 (c)(1),
(2) Date: Dec. 22, 2023

(87) PCT Pub. No.: WO2023/098757
PCT Pub. Date: Jun. 8, 2023

(65) Prior Publication Data
US 2024/0297389 A1 Sep. 5, 2024

(30) Foreign Application Priority Data

Nov. 30, 2021 (CN) .......................... 202111444383.8
Dec. 26, 2021 (CN) .......................... 202111606763.7
(Continued)

(51) Int. Cl.
*B60K 1/04* (2019.01)
*B60L 50/64* (2019.01)
(Continued)

(52) U.S. Cl.
CPC ................ *B60K 1/04* (2013.01); *B60L 50/64* (2019.02); *B60L 53/80* (2019.02); *H01M 10/46* (2013.01);
(Continued)

(58) Field of Classification Search
CPC ........... B60K 1/04; B60L 50/64; B60L 53/80; H01M 50/249; H01M 50/262;
(Continued)

(56) References Cited

U.S. PATENT DOCUMENTS

| | | | |
|---|---|---|---|
| 9,630,483 B2 * | 4/2017 | Yamada | ................... B60K 1/04 |
| 2012/0111654 A1 * | 5/2012 | Origuchi | ................ B60L 53/80 |
| | | | 180/68.5 |
| 2024/0030541 A1 | 1/2024 | Zhang et al. | |

FOREIGN PATENT DOCUMENTS

| | | | | |
|---|---|---|---|---|
| CN | 102529666 A | * | 7/2012 | |
| CN | 209700366 U | * | 11/2019 | .......... H01M 50/204 |

(Continued)

OTHER PUBLICATIONS

Feb. 20, 2023 International Search Report issued in International Patent Application No. PCT/CN2022/135628.
(Continued)

*Primary Examiner* — John D Walters

(57) ABSTRACT

Disclosed in the present invention are a battery pack tray and an electric vehicle. The battery pack tray comprises a frame
(Continued)

body, wherein at least two placing positions which are sequentially arranged at an interval in a horizontal direction, and a locking cooperating structure are formed on the frame body; the locking cooperating structure is arranged between at least one pair of adjacent placing positions; the locking cooperating structure comprises a locking shaft, and a first connecting plate and a second connecting plate which extend in the lengthwise direction of a longitudinal beam of a vehicle body; and two ends of the locking shaft are respectively connected to the first connecting plate and the second connecting plate, and are used for cooperating with a locking mechanism to realize locking.

17 Claims, 9 Drawing Sheets

(30)         Foreign Application Priority Data

Dec. 26, 2021   (CN) ......................... 202111606781.5
Dec. 31, 2021   (CN) ......................... 202111673736.1

(51) Int. Cl.

| | | |
|---|---|---|
| *B60L 53/80* | (2019.01) | |
| *H01M 10/46* | (2006.01) | |
| *H01M 50/204* | (2021.01) | |
| *H01M 50/209* | (2021.01) | |
| *H01M 50/244* | (2021.01) | |
| *H01M 50/249* | (2021.01) | |
| *H01M 50/262* | (2021.01) | |
| *H01M 50/264* | (2021.01) | |
| *H01M 50/271* | (2021.01) | |
| *H01M 50/289* | (2021.01) | |
| *H01M 50/242* | (2021.01) | |

(52) U.S. Cl.
CPC ....... *H01M 50/204* (2021.01); *H01M 50/209* (2021.01); *H01M 50/244* (2021.01); *H01M 50/249* (2021.01); *H01M 50/262* (2021.01); *H01M 50/264* (2021.01); *H01M 50/271* (2021.01); *H01M 50/289* (2021.01); *B60K 2001/0405* (2013.01); *B60K 2001/0438* (2013.01); *B60K 2001/0455* (2013.01); *B60K 2001/0472* (2013.01); *H01M 50/242* (2021.01); *H01M 2220/20* (2013.01)

(58) Field of Classification Search
CPC ............. H01M 50/289; H01M 50/209; H01M 50/264; H01M 50/244; H01M 50/204; H01M 50/271; H01M 10/46
See application file for complete search history.

(56)         References Cited

FOREIGN PATENT DOCUMENTS

| | | | | |
|---|---|---|---|---|
| CN | 111332151 A | | 6/2020 | |
| CN | 210652648 U | | 6/2020 | |
| CN | 213705146 U | * | 7/2021 | |
| CN | 214057205 U | | 8/2021 | |
| CN | 113415142 A | * | 9/2021 | .......... H01M 50/249 |
| CN | 113415143 A | * | 9/2021 | .......... H01M 50/249 |
| CN | 113479050 A | | 10/2021 | |

OTHER PUBLICATIONS

Feb. 20, 2023 Written Opinion of the International Searching Authority issued in International Patent Application No. PCT/CN2022/135628.

* cited by examiner

BATTERY PACK TRAY AND ELECTRIC VEHICLE

This application is a National Stage of International Application No. PCT/CN2022/135628, filed on Nov. 30, 2022, which claims priority of Chinese patent application CN2021116737361 filed on Dec. 31, 2021, Chinese patent application CN2021116067637 filed on Dec. 26, 2021, Chinese patent application CN2021116067815 filed on Dec. 26, 2021, and Chinese patent application CN2021114443838 filed on Nov. 30, 2021. All the above are hereby incorporated by reference.

TECHNICAL FIELD

The invention relates to the field of an electric vehicle, in particular to a battery pack tray and an electric vehicle.

BACKGROUND

In recent years, new energy vehicles have developed rapidly, electric vehicles that rely on batteries as driving energy have the advantages of zero emission and low noise, with the increasing of market share and use frequency of electric vehicles, electric commercial vehicles in electric vehicles, such as electric heavy-duty trucks and electric light-duty trucks, have gradually begun to appear in their respective application situations, and at the same time, battery swapping stations are correspondingly built to perform battery pack swapping for electric trucks.

In the prior art, the battery pack of an electric vehicle is arranged on a tray or a bracket, and the tray or bracket is locked by a single-end fixed locking matching structure and a locking mechanism on a vehicle body bracket or a vehicle body longitudinal beam, however, because the locking matching structure is fixed at the single-end, when the electric vehicle is running on a rough or bumpy road, the tray or bracket will vibrate or shake relative to the vehicle body bracket or the vehicle body longitudinal beam, and the locking matching structure is the free end and is easy to disengage from the locking mechanism, thereby causing the locking connection to fail, causing the tray or bracket to be separated from the electric vehicle, and even causing serious failure.

CONTENT OF THE PRESENT INVENTION

A technical problem to be solved in the present application is to overcome the defects in the prior art that the battery pack cannot be stably connected to the electric vehicle because the locking matching structure is single-end fixed, and the locking connection is easily detached from the locking mechanism, so that the tray or the bracket is separated from the electric vehicle, providing a battery pack tray and an electric vehicle.

The present application solves the above technical problems by means of the following technical solutions:

A battery pack tray used for installing a battery pack on a vehicle body longitudinal beam, and the battery pack tray comprises:

a frame body, at least two placing positions for placing the battery pack arranged at intervals in the horizontal direction and a locking matching structure are formed on the frame body, and at least one pair of adjacent placing positions is provided with the locking matching structure therebetween;

the locking matching structure comprises a horizontally arranged locking shaft and a first connecting plate and a second connecting plate extending along the length direction of the vehicle body longitudinal beam, and both ends of the locking shaft are respectively connected with the first connecting plate and the second connecting plate for cooperating with a locking mechanism on the vehicle body longitudinal beam to realize locking.

In this solution, both ends of the locking shaft are connected and fixed respectively with the first connecting plate and the second connecting plate, therefore, when the battery pack tray is detachably connected with the locking mechanism by means of the locking shaft, even if the locking shaft is offset in the horizontal direction relative to the locking mechanism, the locking shaft will not come out of the locking mechanism in the horizontal direction under the blocking of the first connecting plate and the second connecting plate, and the connection between the locking mechanism and the locking shaft is more stable, and the carrying effect of the locking shaft is better. At the same time, after the battery pack tray carries the battery pack, when the battery pack is connected to the vehicle body longitudinal beam by the battery pack tray, the center of gravity of the electric vehicle will be lowered, thus making the electric vehicle run more stability.

Preferably, the battery pack tray further comprises:

a second electrical connector for electrical connection with a first electrical connector on the vehicle body longitudinal beam, the second electrical connector is arranged on the frame body at a position corresponding to the first electrical connector, and the second connector is electrically connected to the battery pack;

there are at least three placing positions, and at least one placing position is located between the vehicle body longitudinal beams when the battery pack tray is installed on the vehicle body longitudinal beam.

In this solution, on the premise of ensuring sufficient battery capacity, the space between two vehicle body longitudinal beams, that is, the space between two vehicle body longitudinal beams of an electric vehicle, is fully utilized, and battery packs are respectively laid on the outside and in the middle of the two vehicle body longitudinal beams, thus reducing the space occupied by the battery packs and the battery pack tray in the height direction, leaving enough height space for the battery swapping apparatus to perform battery swapping, and there is no need to set a sinking space for the battery swapping apparatus or configure a lifting device to lift the vehicle, thus reducing the cost of building the station.

Preferably, the frame body comprises a plurality of sub-frames arranged in parallel and fixed beams, the plurality of sub-frames are connected by the fixed beams, both of the first connecting plate and the second connecting plate are connected to the fixed beam, and the sub-frame forms the corresponding placing position.

In this solution, each sub-frame carries one battery pack correspondingly, forming a standardized module, which is conducive to material management, and a frame structure is formed by means of which two fixing beams are connected to both ends of the multiple sub-frames and the first connecting plate and the second connecting plate are connected to the fixing beams, so that the entire frame body is connected to each other, and the overall structural strength and stability of the frame body are increased.

Preferably, the locking matching structure further comprises a reinforcing plate, the first connecting plate, the reinforcing plate and the second connecting plate are sequentially connected to form a U-shaped structure, and the locking shaft is located in an opening of the U-shaped structure.

In this solution, the reinforcing plate can strengthen the structural strength of the first connecting plate and the second connecting plate, and the U-shaped structure as a whole has greater strength to withstand larger loads and avoid damage to the locking matching structure due to the excessive mass of the battery pack placed on the battery pack tray.

Preferably, a penetrating unlocking guide hole is arranged on the reinforcing plate at a position corresponding to a locking rod of the locking mechanism.

In this solution, a unlocking device (for example, an unlocking rod) can contact the locking rod passing through the unlocking guide hole, so as to control the movement of the locking rod to realize the unlocking or locking of the locking mechanism, that is, the unlocking guide hole enables the unlocking device to be arranged below the battery pack tray with relatively large operation space. If the unlocking guide hole is a long waist hole and its length direction is parallel to the extension direction of the vehicle body longitudinal beam, even if there is a deviation in the parking position of the battery swapping trolley before unlocking, the unlocking device can still pass through the unlocking guide hole to contact the locking rod, so as to realize the unlocking or locking function of the locking rod.

Preferably, an upper end of the U-shaped structure is not higher than an upper end face of the sub-frame.

In this solution, the U-shaped structure will not occupy the space above the sub-frame, freeing up more space to arrange the battery pack, under the premise of ensuring sufficient battery capacity, the battery pack will not protrude to the outside of the electric vehicle and the size of the battery pack tray in the height direction will be reduced as much as possible, thereby increasing the height space below the battery pack tray.

Preferably, a plurality of the placing positions are arranged along the width direction of the vehicle body longitudinal beam, and a plurality of the sub-frames are arranged in parallel to each other.

In this solution, the battery pack is arranged in the width direction of the vehicle body longitudinal beam, so as to minimize the space occupied by the battery pack in the height direction as much as possible, increase the height space under the electric vehicle as much as possible, and leave enough battery swapping height space for the battery swapping equipment.

Preferably, the sub-frame comprises a supporting beam and a reinforcing beam connected to each other, and the battery pack is installed on the supporting beam and the reinforcing beam;

In this solution, the reinforcing beam plays the role of strengthening the placing position and can support the battery pack at the same time, and the mutually connected supporting beam and the reinforcing beam jointly support the battery pack, so that the structure is more stable and it is guaranteed that the battery pack tray can carry the battery pack reliably.

Preferably, there are two supporting beams, and the two supporting beams are arranged at intervals, and a reinforcing beam is arranged between the two supporting beams.

In this solution, the two supporting beams can meet the requirements of supporting the battery pack, and the structure is simple, by means of arranging the reinforcing beam between the supporting beams, the structural strength of the sub-frame is further improved, and meanwhile the reinforcing beams can also carry the battery pack and share the load of the battery pack.

Preferably, there are two fixing beams, and both ends of the sub-frame, the first connecting plate and the second connecting plate are respectively connected with the two fixing beams.

In this solution, both ends of the frame and both ends of the first connecting plate and the second connecting plate are connected to the fixing beams, thus improving the structural stability of the sub-frame, the first connecting plate and the second connecting plate; in addition, the same fixing beam is used to reinforce the sub-frame, the first connecting plate and the second connecting plate at the same time, thus reducing the number of parts and simplifying the structure of the battery pack tray.

Preferably, the battery pack tray further comprises a limiting structure, and the limiting structure comprises a stand column and a limiting rod, wherein the stand column is arranged on the fixed beam at a position corresponding to between of the adjacent placing positions, a first end of the limiting rod is connected with the stand column, and a second end of the limiting rod is connected with the fixing beam and extends to the outside of the sub-frame;

In this solution, when the battery pack is placed in the sub-frame, the limiting structure is located at the outside of the battery pack, so that the battery pack can be prevented from falling from the sub-frame, and at the same time, the limiting rod strengthens the structural strength of the connection position between the stand column and the fixing beam.

Preferably, the connection position of the stand column and the fixing beam is provided with reinforcing ribs.

In this solution, the reinforcing rib can further strengthen the structural strength of the connection position between the stand column and the fixing beam, and ensure that the stand column can be firmly connected to the fixing beam, preferably, the reinforcing rib is triangular, and the two sides of the reinforcing rib are respectively connected to the stand column and the fixing beam (for example, by welding).

Preferably, there are two locking matching structures, and the number of placing positions on the side of the two locking matching structures far from the vehicle body longitudinal beam is equal, and the second electrical connector is located between the two locking matching structures.

In this solution, the reliability of locking between the battery pack tray and the vehicle body longitudinal beam can be improved by arranging two locking matching structures; the second electrical connector is arranged at the inner side of the two locking matching structures, so that the line is more concealed and the reliability of the line is improved.

Preferably, the battery pack tray further comprises a fixing plate, and the second electrical connector is arranged on the fixing plate, and the fixing plate is located between two fixing beams along the longitudinal direction of the vehicle body longitudinal beam.

In this solution, when the battery pack tray is arranged on the vehicle body longitudinal beam by means of the vehicle body bracket, in order to realize the docking between the first electrical connector and the second electrical connector, the fixing plate is used to provide the installation position for the second electrical connector, so as to avoid the strength reduction of the fixing beam caused by opening a hole for connecting the second electrical connector and avoid the vehicle body bracket.

Preferably, there are a plurality of locking shafts, and the plurality of locking shafts are horizontally arranged at intervals along the longitudinal direction of the vehicle body longitudinal beam.

In this solution, a plurality of locking shafts are distributed between the first connecting plate and the second connecting plate, so that the battery pack tray can be connected with the vehicle body longitudinal beam through multipoint contact, so that the weight of the battery pack tray is more evenly distributed on the first connecting plate and the second connecting plate, and the connection is firmer.

An electric vehicle, comprising a vehicle body longitudinal beam and the battery pack tray as described above, the vehicle body longitudinal beam is provided with a locking mechanism, and the battery pack tray is detachably connected to the vehicle body longitudinal beam by means of the locking matching structure and the locking mechanism.

In this solution, the battery pack tray can be detachably installed on the electric vehicle by means of the matching of the locking mechanism on the vehicle body longitudinal beam and the locking connection structure on the battery pack tray, thus realizing the disassembly and assembly of the battery pack. Both ends of the locking shaft are connected and fixed respectively with the first connecting plate and the second connecting plate, the locking shaft will not come out of the locking mechanism under the blocking of the first connecting plate and the second connecting plate, and the connection between the locking mechanism and the locking shaft is more stable, and the carrying effect of the locking shaft is better. At the same time, after the battery pack tray carries the battery pack, when the battery pack is connected to the vehicle body longitudinal beam by the battery pack tray, the center of gravity of the electric vehicle will be lowered, thus making the electric vehicle run more smoothly.

Preferably, the electric vehicle further comprising a vehicle body bracket, the vehicle body bracket is arranged on the vehicle body longitudinal beam and the locking mechanism is arranged on the vehicle body bracket.

In this solution, the locking mechanism is arranged on the vehicle body bracket, thus avoiding the modification of the vehicle body longitudinal beam, by means of locking the battery pack tray with the locking mechanism on the vehicle body bracket, the battery pack can be reliably fixed relative to the vehicle body longitudinal beam.

Preferably, the locking mechanism is provided with a through groove for the locking shaft to pass through, and the through groove is located below the vehicle body longitudinal beam or the vehicle body bracket.

In this solution, the locking shaft enters the locking mechanism from bottom to top through the through groove to realize the locking matching between the locking structure and the locking mechanism.

Preferably, there are two vehicle body longitudinal beams, and a beam is arranged between the two vehicle body longitudinal beams, and the beam is located outside the battery pack tray.

In this solution, the beam plays a role in reinforcing the vehicle body longitudinal beam, and the beam is located outside the battery pack tray, so as to avoid the interference between the beam and the battery pack located between the two connecting beams on the battery pack tray, which has little influence on the layout of the battery pack, and the battery pack can be transformed into a special shape without accommodating the structure of the frame, thereby reducing the cost of the battery pack.

Preferably, there are two vehicle body longitudinal beams, a beam is arranged between the two vehicle body longitudinal beams, and the beam passes through the placing positions between the two vehicle body longitudinal beams.

In this solution, the beam plays a role in strengthening the vehicle body longitudinal beam, which makes the vehicle body longitudinal beam have better carrying capacity and the battery pack can be reliably loaded on the vehicle body longitudinal beam.

Preferably, a battery pack is arranged in the placing position of the battery pack tray, the battery pack in the placing position, through which the beam passes, between the two vehicle body longitudinal beams, is provided with an avoidance part for avoiding the beam or is divided into a plurality of battery packs by the beam.

In this solution, the battery pack will not interfere with the beam by arranging the avoidance part on the battery pack or dividing the battery pack into a plurality of small battery packs, so as to ensure that the battery pack can be conveniently installed on the battery pack tray, and make full use of the space between the two battery pack longitudinal beams, thus reserving a larger power swap height space for the power exchange equipment.

Preferably, the top of the battery pack in the placing position, through which the beam passes, between the two vehicle body longitudinal beams is higher than the bottom of the vehicle body longitudinal beams or the vehicle body bracket.

In this solution, after the battery pack tray is installed in place, the battery pack extends towards the upper side of the vehicle body longitudinal beam or the vehicle body bracket, so as to make full use of the space in the vehicle body longitudinal beam or the vehicle body bracket, and further reserve a larger battery swapping height space for the battery swapping apparatus.

Preferably, there are two locking matching structures of the battery pack tray, and the two locking matching structures are located between the two vehicle body longitudinal beams, and the locking mechanisms are arranged at opposite sides of the vehicle body bracket;

or, there are two locking matching structures of the battery pack tray, and the two locking matching structures are located outside the two vehicle body longitudinal beams, and the locking mechanisms are arranged at opposite sides of the vehicle body bracket.

In this solution, the locking matching structure is located between two vehicle body longitudinal beams, which are located outside the locking matching structure, and the locking matching structure is hidden, which plays a certain role in protecting the locking matching structure and improving the connection reliability between the battery pack tray and the vehicle body longitudinal beams. And when the locking matching structure is located outside of the two vehicle body longitudinal beams, the battery pack tray can be connected from both sides of the two vehicle body longitudinal beams, and a reliable connection between the battery pack tray and the vehicle body longitudinal beams is achieved.

The positive improved effects of the present disclosure are that:

The battery pack tray of the present invention realizes locking and unlocking by means of the locking shaft and the locking mechanism on the vehicle body longitudinal beam, therefore, when the battery pack tray is detachably connected with the locking mechanism through the locking shaft and the locking mechanism, even if the locking shaft is offset in the horizontal direction relative to the locking mechanism, the locking shaft will not come out of the locking mechanism under the blocking of the first connecting plate and the second connecting plate, and the connection between the locking mechanism and the locking shaft is more stable, and the loading effect of the locking bearing is better. At the same time, after the battery pack tray carries the battery pack, when the battery pack is connected to the vehicle body longitudinal beam, the center of gravity of the electric vehicle will be lowered, thus making the electric vehicle run more smoothly.

Figure 1:
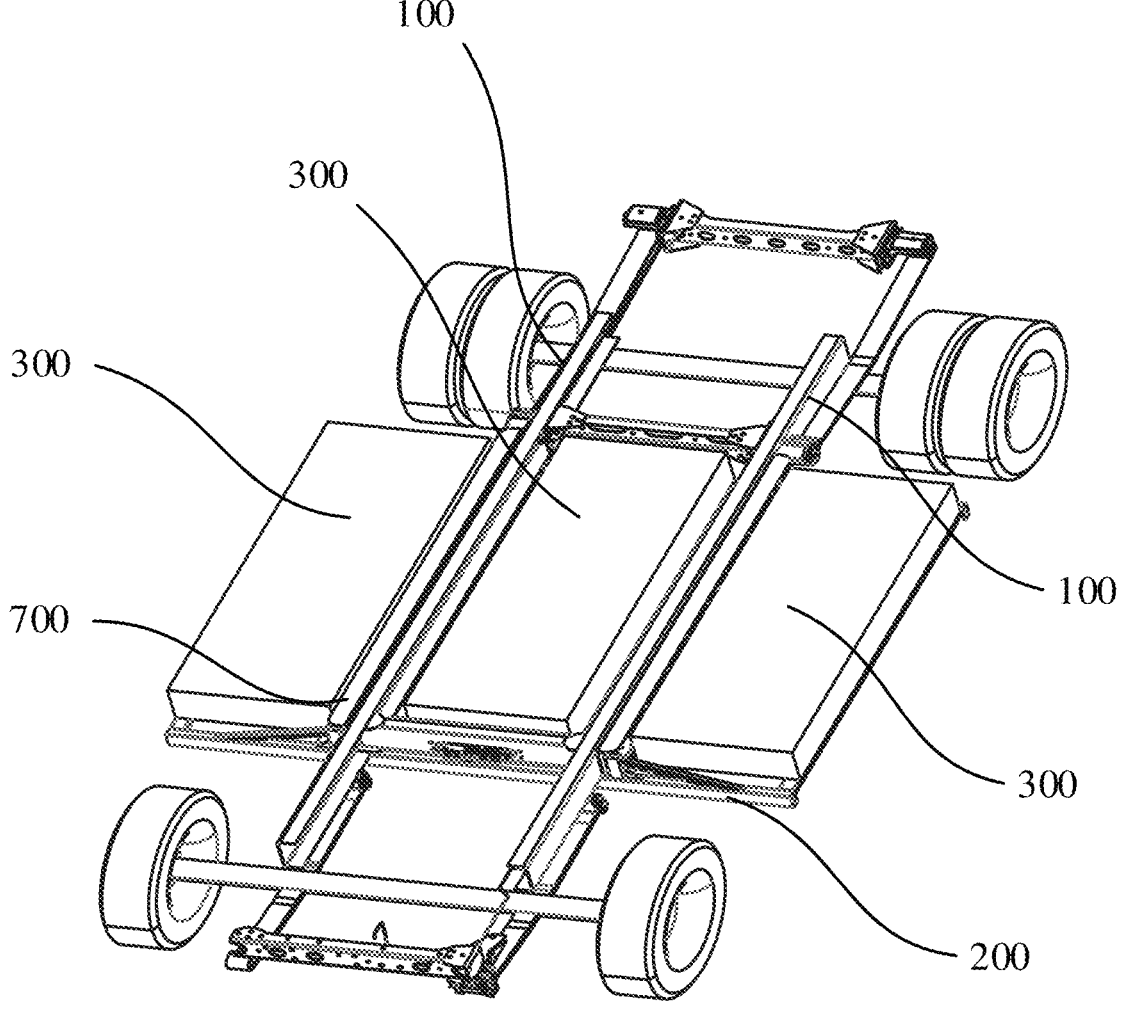
FIG. 1 is a partially structural schematic diagram (I) of the electric vehicle in embodiment 1 of the invention.
Figure 2:
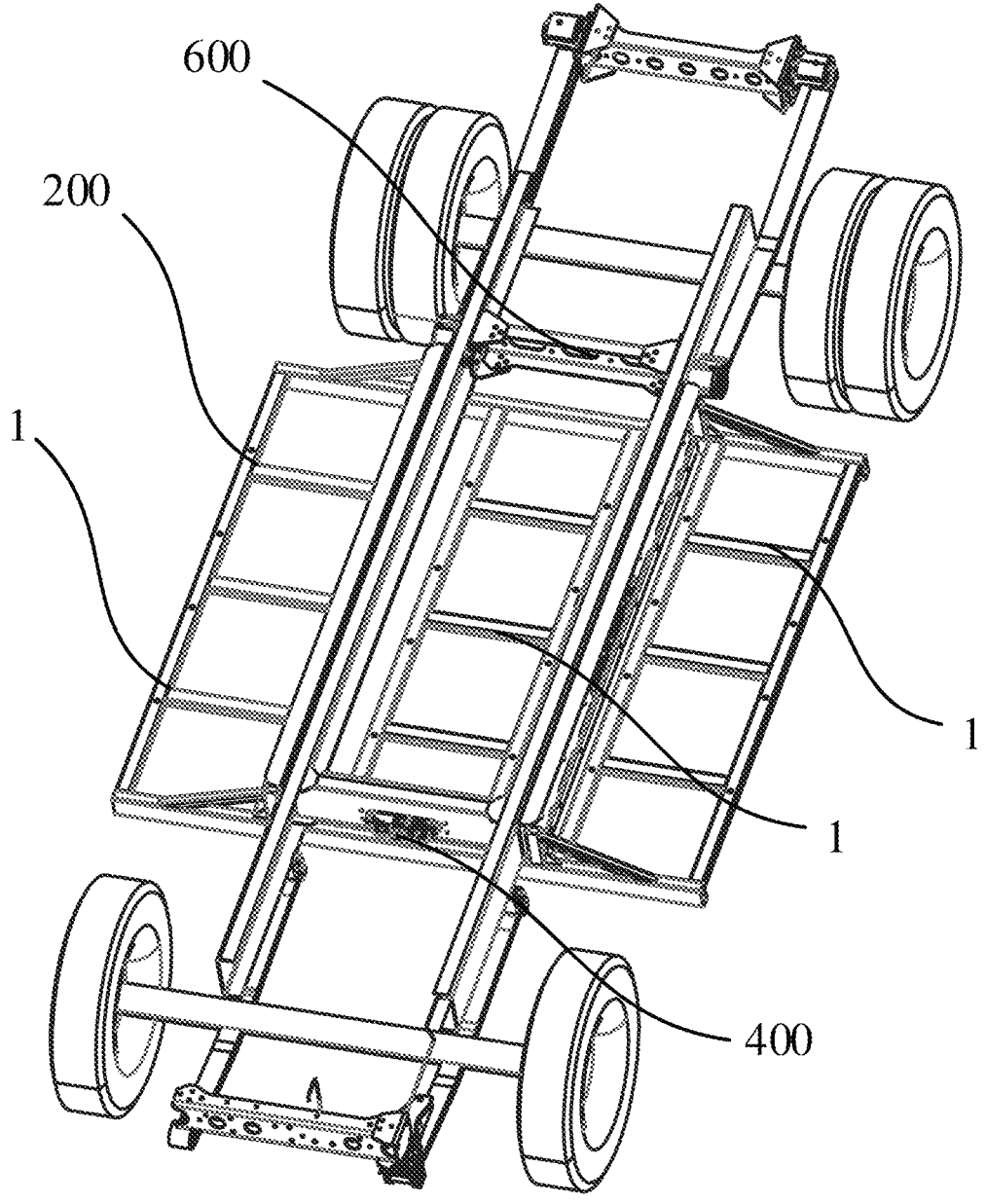
FIG. 2 is a partially structural schematic diagram (II) of the electric vehicle in embodiment 1 of the invention.

Description of reference numerals: vehicle body longitudinal beam 100; locking mechanism 10; through groove 101; locking rod 102; locking base 103; locking groove 104; locking tongue 105; first opening 106; locking space 107; through hole 108; supporting base 109; supporting groove 110; second opening 111; battery pack tray 200; locking matching structure 20; locking shaft 201; first connecting plate 30; second connecting plate 40; U-shaped structure 50; placing position 1; reinforcing plate 2; unlocking guide hole 21; sub-frame 3; supporting beam 31; reinforcing beam 32; fixing beam 4; stand column 5; limiting rod 6; fixing plate 7; reinforcing rib 8; battery pack 300; first electrical connector 400; second electrical connector 500; beam 600; vehicle body bracket 700

DETAILED DESCRIPTION OF THE PREFERRED EMBODIMENT

The invention is further described below by way of embodiments, but the invention is not thereby limited to the scope of the embodiments.

Embodiment 1

This embodiment provides a specific implementation of an electric vehicle, see FIG. 1 to FIG. 6, the electric vehicle comprises two mutually parallel vehicle body longitudinal beams 100, a battery pack 300 and a battery pack tray 200 which carries the battery pack 300, the battery pack tray 200 being detachably connected to a locking mechanism 10 on the vehicle body longitudinal beam 100 by means of a locking matching structure. Battery pack tray 200 is capable of carrying battery pack 300, and battery pack 300 swapping for electric vehicles is achieved through the disassembly and assembly of the battery pack tray 200 on the vehicle body longitudinal beam 100. The battery pack tray 200 can be detachably installed on the electric vehicle by means of the cooperation of the locking mechanism 10 on the vehicle body longitudinal beam 100 and the locking matching structure on the battery pack tray 200, thus realizing the disassembly and assembly of the battery pack 300. In this embodiment, the electric vehicle is a heavy-duty vehicle or light-duty vehicle, of course, can also be applied to passenger vehicle models such as cars.

In this embodiment, the battery pack tray 200 comprises a frame body, wherein at least two placing positions 1 arranged at intervals in sequence in the horizontal direction and locking matching structures 20 for placing battery packs 300 are formed on the frame body, and at least one pair of adjacent placing positions 1 is provided with the locking matching structure 20 therebetween; the locking matching structure 20 comprises a horizontally arranged locking shaft 201 and a first connecting plate 30 and a second connecting plate 40 extending along the length direction of the vehicle body longitudinal beam 100, wherein both ends of the locking shaft 201 are respectively connected with the first connecting plate 30 and the second connecting plate 40 for cooperating with the locking mechanism 10 on the vehicle body longitudinal beam 100 to realize locking.

Both ends of the locking shaft 201 are connected and fixed respectively with the first connecting plate 30 and the second connecting plate 40, therefore, when the battery pack tray 200 is detachably connected with the locking mechanism 10 by means of the locking shaft 201, even if the locking shaft 201 is offset in the horizontal direction relative to the locking mechanism 10, the locking shaft 201 will not come out of the locking mechanism 10 under the blocking of the first connecting plate 30 and the second connecting plate 40, and the connection between the locking mechanism 10 and the locking shaft 201 is more stable, and the carrying effect of the locking bearing is better.

Specifically, the first connecting plate 30 and the second connecting plate 40 are provided parallel to each other and the two ends of the locking shaft 201 are welded to the first connecting plate 30 and the second connecting plate 40, or, in other embodiments, the first connecting plate 30 and the second connecting plate 40 can be provided with through-holes in corresponding positions, and the two ends of the locking shaft 201 are penetrated into the through-holes on the corresponding sides and protrude from the through-holes, and the end of the locking shaft 201 is provided with a connection structure so that the locking shaft 201 is fixed to the first connecting plate 30 and the second connecting plate 40, for example, the connecting structure is an annular groove arranged on the part of the locking shaft 201 that extends out of the through-hole, and a snap spring can be arranged in the annular groove, or the connecting structure is a protrusion part in the part of the locking shaft 201 that extends out of the through-hole, and the protrusion part is a block-like structure that extends outwardly in the circumference of the locking shaft 201.

Preferably, there are a plurality of locking shafts 201, and the locking shafts 201 are horizontally arranged at intervals along the longitudinal direction of the vehicle body longitudinal beam 100. A plurality of locking shafts 201 are distributed between the first connecting plate 30 and the second connecting plate 40, so that the battery pack tray 200 can be connected with the vehicle body longitudinal beam 100 by means of multipoint contact, so that the weight of the battery pack tray 200 is more evenly distributed on the first connecting plate 30 and the second connecting plate 40, and the connection is firmer.

Further, the battery pack tray 200 further comprises a second electrical connector 500 for electrically connecting to a first electrical connector 400 on the vehicle body longitudinal beam 100, the second electrical connector 500 is arranged on the frame body at a position corresponding to the first electrical connector 400, and the second connector is electrically connected to the battery pack 300, and at least three of the placing position 1 are provided, and at least one placing position 1 is located between the vehicle body longitudinal beams 100 when the battery pack tray 200 is installed on the vehicle body longitudinal beam 100.

In this embodiment, the placing position are three and there are two locking matching structures 20 located between the first placing position and the second placing position, and between the second placing position and the third placing position. When the battery pack tray is installed on the vehicle body longitudinal beam, one placing position is located between the vehicle body longitudinal beams and the two locking matching structures 20 are located outside the two vehicle body longitudinal beams.

The frame body comprises three sub-frames 3 arranged in parallel and two fixing beams 4, three sub-frames 3 are connected by the fixing beams 4, both ends of the first connecting plate 30 and the second connecting plate 40 are connected to the fixing beams 4 on the corresponding side, and the sub-frames 3 form the corresponding placing positions 1, i.e., the aforementioned three placing positions 1. Each sub-frame carries one battery pack 300 correspondingly, forming a standardized module, which is conducive to material management, two fixing beams 4 are connected at both ends of three sub-frames 3, and a frame structure is formed by means of the fixing beams 4, so that the entire frame body is connected to each other, and the overall structural strength and stability of the frame body are increased.

Further, in order to improve the structural strength of the locking matching structure 20, the locking matching structure 20 further comprises a reinforcing plate 2, the first connecting plate 30, the reinforcing plate 2 and the second connecting plate 40 are sequentially connected to form a U-shaped structure 50, the locking shaft 201 is located in the opening of the U-shaped structure 50. Specifically, in this embodiment, the reinforcing plate 2 is connected to the lower ends of the first connecting plate 30 and the second connecting plate 40, and forms a closed structure at the ends to prevent the two ends from approaching or being far away from each other, and to prevent the first connecting plate 30 and the second connecting plate 40 from deflecting.

Figure 4:
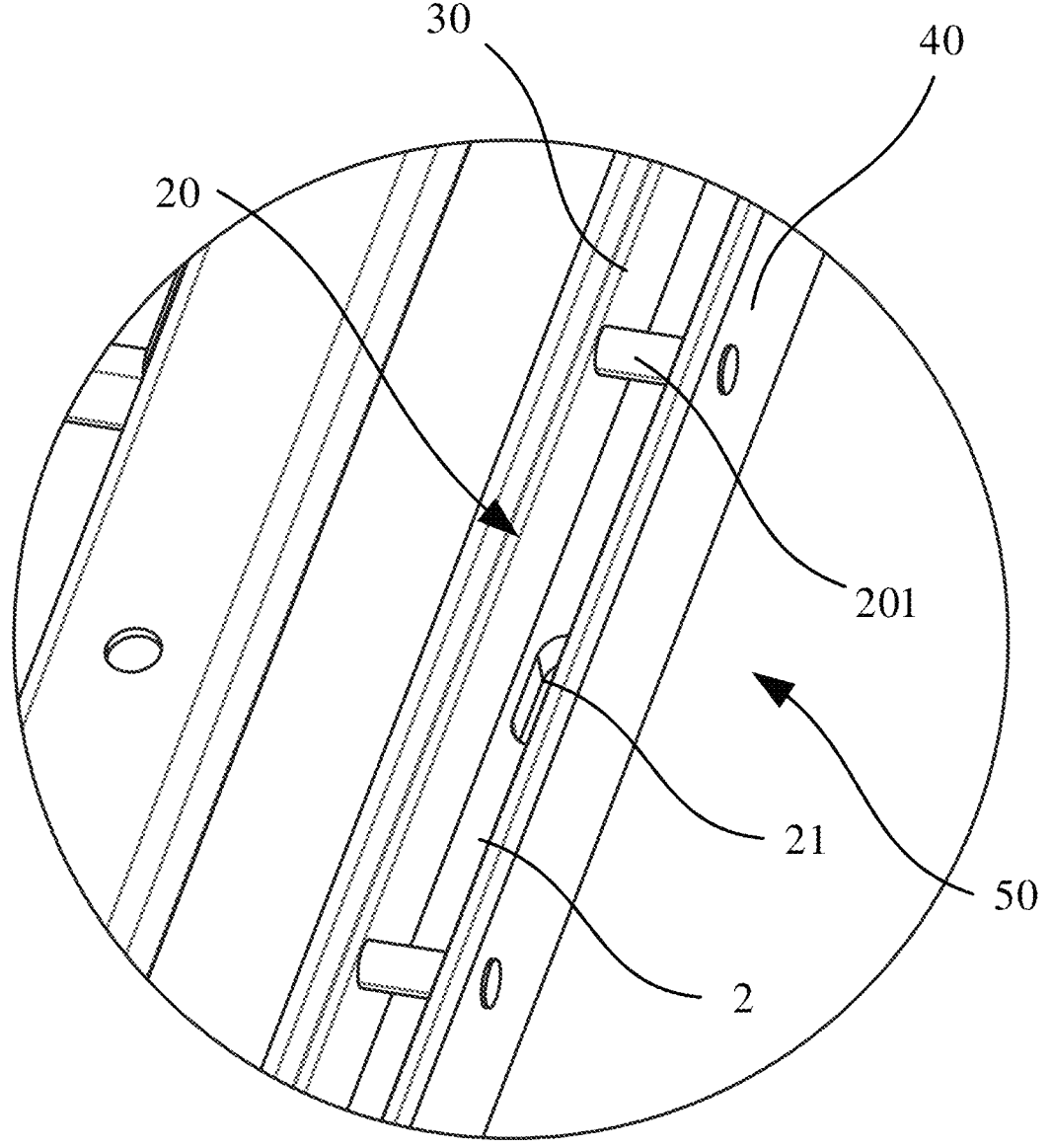
FIG. 4 is an enlarged schematic diagram of FIG. 3 at A.
Figure 5:
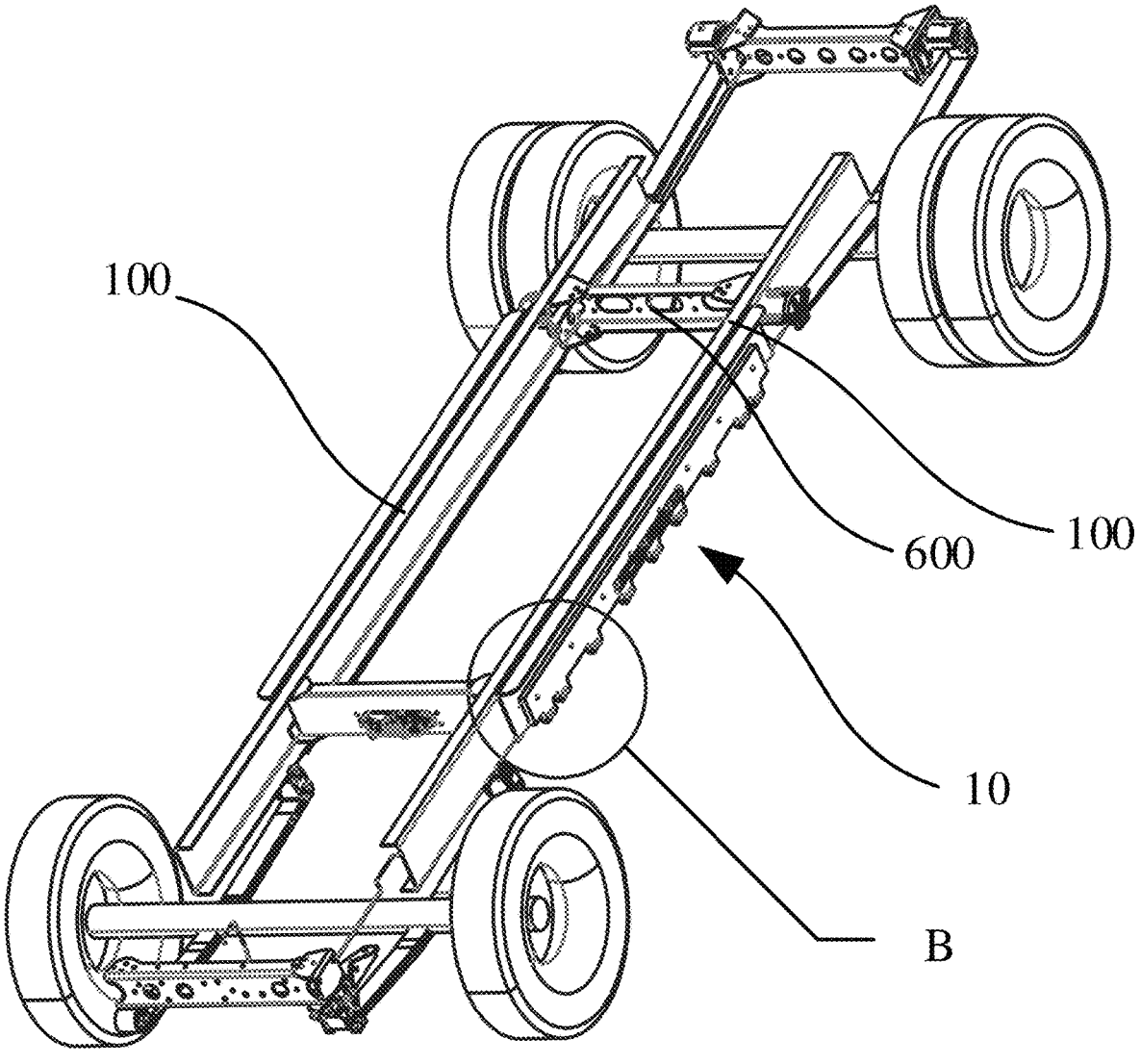
FIG. 5 is a partially structural schematic diagram (III) of the electric vehicle in embodiment 1 of the invention.
Figure 6:
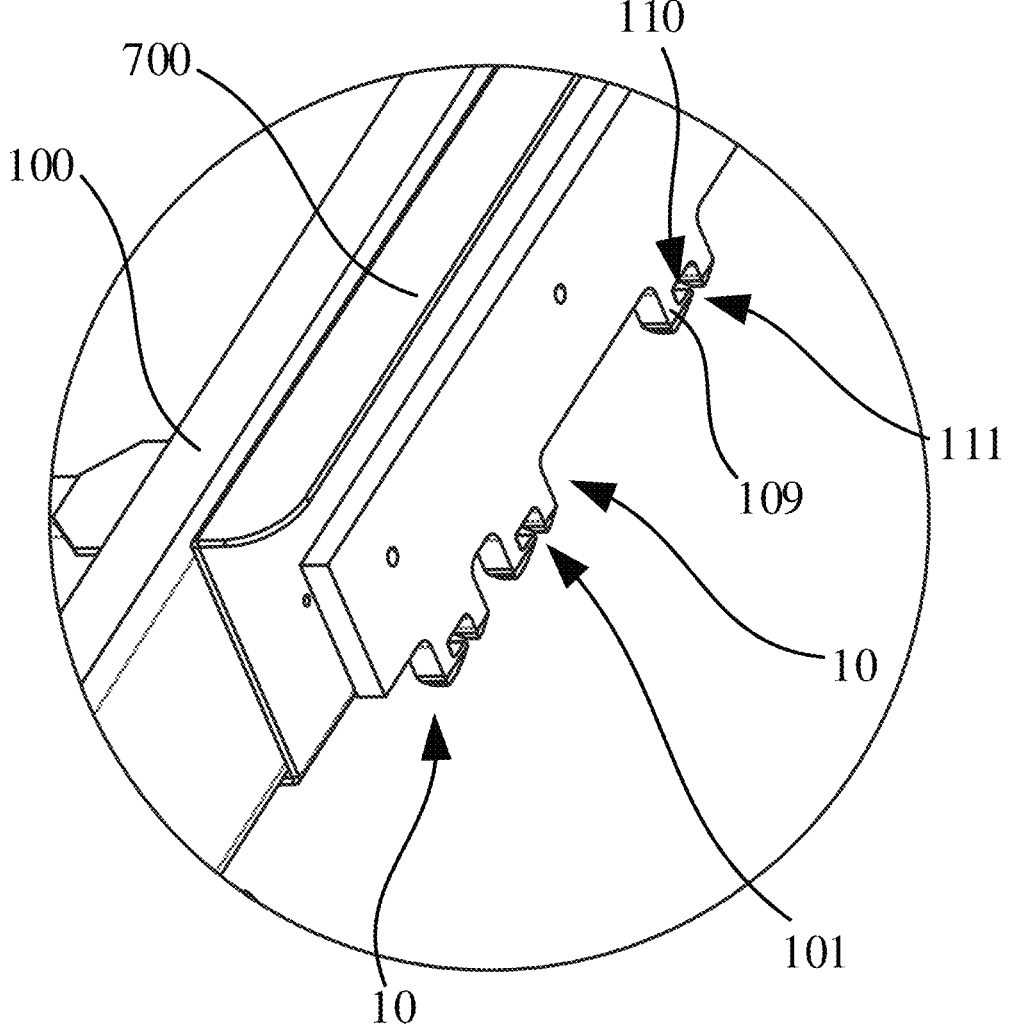
FIG. 6 is an enlarged schematic diagram of FIG. 5 at B.

As shown in FIG. 4, a penetrating unlocking guide hole 21 is arranged on the reinforcing plate 2 at a position corresponding to the connecting rod 102 of the locking mechanism 10. The unlocking device (for example, the unlocking rod) can pass through the unlocking guide hole 21 and contact the locking rod 102, so as to control the locking rod 102 to realize the unlocking or locking of the locking mechanism 10.

As a preferred embodiment, if the unlocking guide hole 21 is a long waist hole and its length direction is parallel to the extension direction of the vehicle body longitudinal beam 100, even if there is a deviation in the parking position of the battery swapping trolley before unlocking, the unlocking device can still pass through the unlocking guide hole 21 and contact the locking rod, so as to realize the unlocking or locking function of the locking rod.

Figure 8:
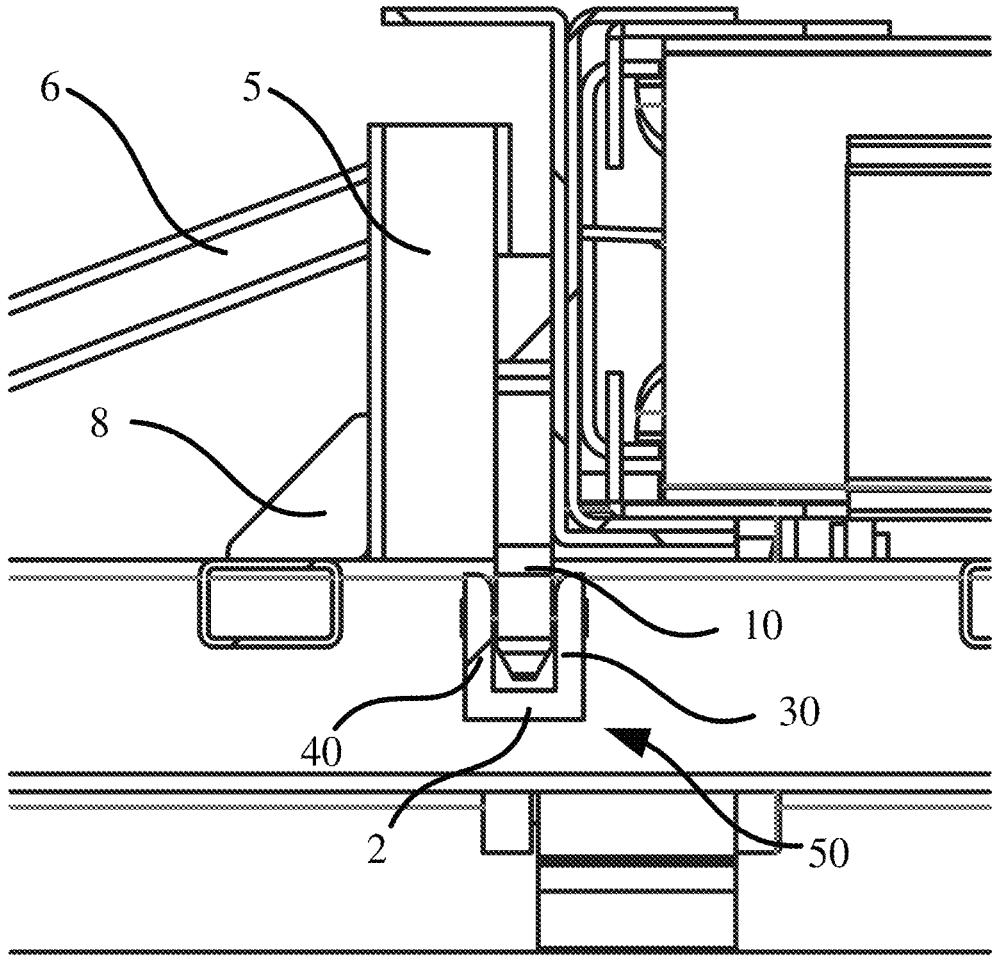
FIG. 8 is a partially sectional view of the electric vehicle in embodiment 1 of the invention.

As shown in FIG. 8, the upper end of the U-shaped structure 50 is not higher than the upper end face of the sub-frame 3. The U-shaped structure 50 does not occupy the space above the sub-frame 3, leaving more space for arranging the battery pack 300. The three placing positions 1 are arranged along the width direction of the vehicle body longitudinal beam 100, and the three sub-frames 3 are arranged in parallel to each other. The battery pack 300 is arranged in the width direction of the vehicle body longitudinal beam 100, so as to minimize the space occupied by the battery pack 300 in the height direction.

Specifically, the sub-frame 3 comprises supporting beams 31 and reinforcing beams 32 connected to each other, and the battery pack 300 is installed on the supporting beams 31 and reinforcing beams 32 by screw joint. In this embodiment, there are two supporting beams 31 parallel to each other, and the distance between the supporting beams 31 is substantially equal to the width of the battery pack 300. In other specific implementation manners, the connection method between the battery pack 300 and the sub-frame 3 is not limited to this example, and other detachably connection methods such as clamping, bonding, etc. may also be used, which will not be repeated here.

The multiple reinforcing beams 32 are arranged between the two supporting beams 31. The reinforcing beams 32 are arranged in parallel to each other, so that the sub-frame 3 can more evenly share the load of the battery pack 300. In this embodiment, the reinforcement beam 32 and the supporting beam 31 are arranged at a right angle, in other embodiments, the reinforcement beam 32 can also be arranged at an acute angle with the supporting beam 31 to form a triangular structure, in order to carry the battery pack 300 more stably.

In other specific embodiments, the number of the placement positions 1 and the locking matching structures 20 is not limited to this example, and there may be two placement positions 1, two locking matching structures 20, or more placing positions 1, such as four, five, etc., at this time, the locking matching structure 20 can be arranged to one or two correspondingly, which will not be repeated here.

More preferably, in order to make the center of gravity of the battery pack tray 200 located in the middle of the battery pack tray after the battery pack 300 is installed, the number of the placing positions on the side of the two locking matching structures 20 away from the vehicle body longitudinal beam is equal, and the second electrical connector 500 is located between the two locking matching structures 20.

In order to avoid the vehicle body longitudinal beam 100 from being remoulded into a special shape, the electric vehicle of this embodiment also comprises a vehicle body bracket 700, the vehicle body bracket 700 is arranged on the vehicle body longitudinal beam 100 and the locking mechanism 10 is arranged on the opposite side of the vehicle body bracket 700 in the width direction of the vehicle body longitudinal beam 100, the two locking matching structure 20 are located outside the two vehicle body longitudinal beams, likewise outside the vehicle body bracket 700.

Specifically, the locking mechanism 10 is provided with a through groove 101 through which the locking shaft 201 passes, and the through groove 101 is located below the vehicle body bracket 700. The locking shaft 201 enters locking mechanism 20 from bottom to top through the through groove 101 to realize the locking matching between the locking matching structure 20 and the locking mechanism 10.

In other specific embodiments, if the locking mechanism 10 is directly connected to the vehicle body longitudinal beam 100, and the through groove 101 is located below the vehicle body longitudinal beam 100.

Figure 9:
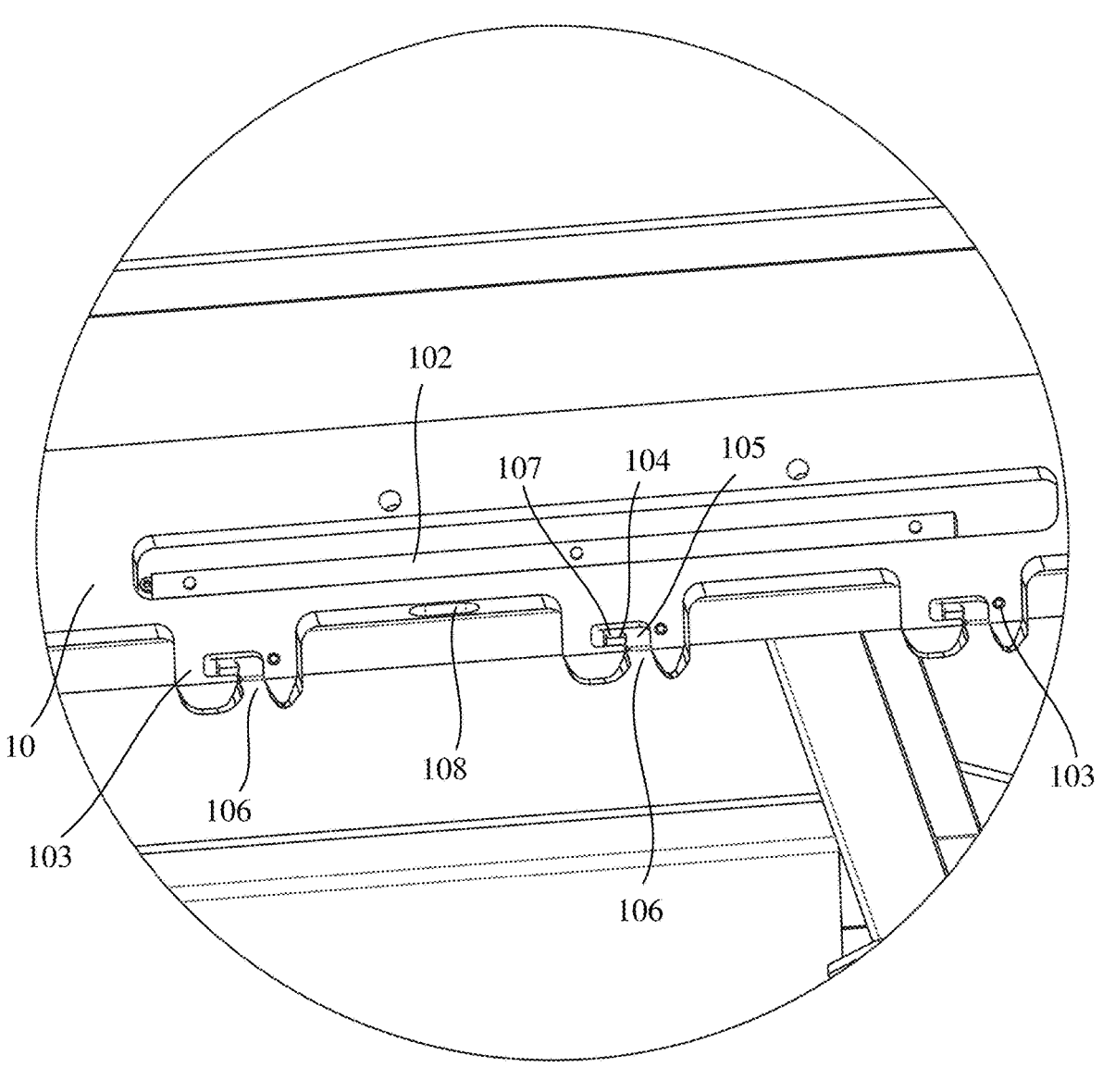
FIG. 9 is a partially structural schematic diagram at the position of the locking mechanism of the electric vehicle in embodiment 1 of the present invention.

As shown in FIG. 9, the structure of the locking mechanism 10 will be introduced below. In this embodiment, the through groove 101 comprises a locking groove 104 and a supporting groove 110, and the locking mechanism comprises three locking bases 103, a locking groove 104 for the locking shaft 201 on the battery tray 300 to enter and be locked is arranged within the locking bases 103, the locking groove 104 has a horizontally extending locking space 107 and communicates with the spaces on both sides of the locking grooves 104, and at least part of the locking tongue 105 is inserted into the locking grooves 104 to restrict the locking shaft 201 to leave the locking space 107. One end of the locking tongue 105 is rotatably arranged in the locking base 103, and the other end of the locking tongue 105 is rotatably connected with the locking rod 102. The locking rod 102 is used to drive the locking tongue 105 to switch between an unlocked state and a locked state under an unlocking driving force, so as to open or close the first opening 106 for the locking shaft 201 to enter and exit the locking groove 104. The first opening 106 is a bell mouth, which is convenient for the locking shaft of the battery pack 300 to enter the locking groove 104.

The locking mechanism 10 further comprises a plurality of supporting bases 109, the supporting base 109 is arranged in the same height direction as the locking base 103, and is provided with a supporting groove 110, which has a horizontally extending locking space 107 and communicates with the spaces on both sides of the supporting base 109, and one end of the supporting groove 110 is provided with a second opening 111, which is a bell mouth, so that the locking shaft of the battery pack 300 to enter the supporting groove 110.

The locking rod 102 can drive a plurality of locking tongues 105 to rotate synchronously, so as to control the locking tongues 105 to rotate between an unlocked state and a locked state through the locking rod 102, so as to open or close the first opening 106 of the locking shaft 201 enter and exit the locking groove 104.

The process of installing the battery pack tray 200 on the vehicle body longitudinal beam 100 and locking the battery pack tray 200 is as follows: after the unlocking mechanism of the battery swapping apparatus passes through the through hole 108, the locking rod 102 is jacked up, the locking tongue 105 rotates to the unlocked state, so that the first opening 106 is opened, part of the locking shaft 201 vertically enters the locking groove 104 through the first opening 106, and then the locking shaft 201 moves laterally into the locking space 107, finally, the unlocking mechanism does not continue to jack up the locking rod 102, and the locking rod 102 is reset, so that the locking tongue 105 rotates to the locked state and closes the first opening 106, so that the locking shaft 201 is locked in the locking space. While part of the locking shafts 201 enter the locking groove 104, another part of the locking shafts 201 will enter the supporting groove 110 through the second openings 111.

The unlocking process of the battery pack tray 200 can refer to the above-mentioned locking process, and the battery pack tray 200 can be unlocked by reversely operating the above-mentioned locking process.

In this embodiment, a beam 600 is provided between two vehicle body longitudinal beams 100, and the beam 600 is located outside the battery pack tray 200. The beam 600 plays a role in reinforcing the vehicle body longitudinal beam 100, the beam 600 is located outside the battery pack tray 200 to prevent the beam 600 from interfering with the battery pack 300 on the battery pack tray 200.

Embodiment 2

Figure 3:
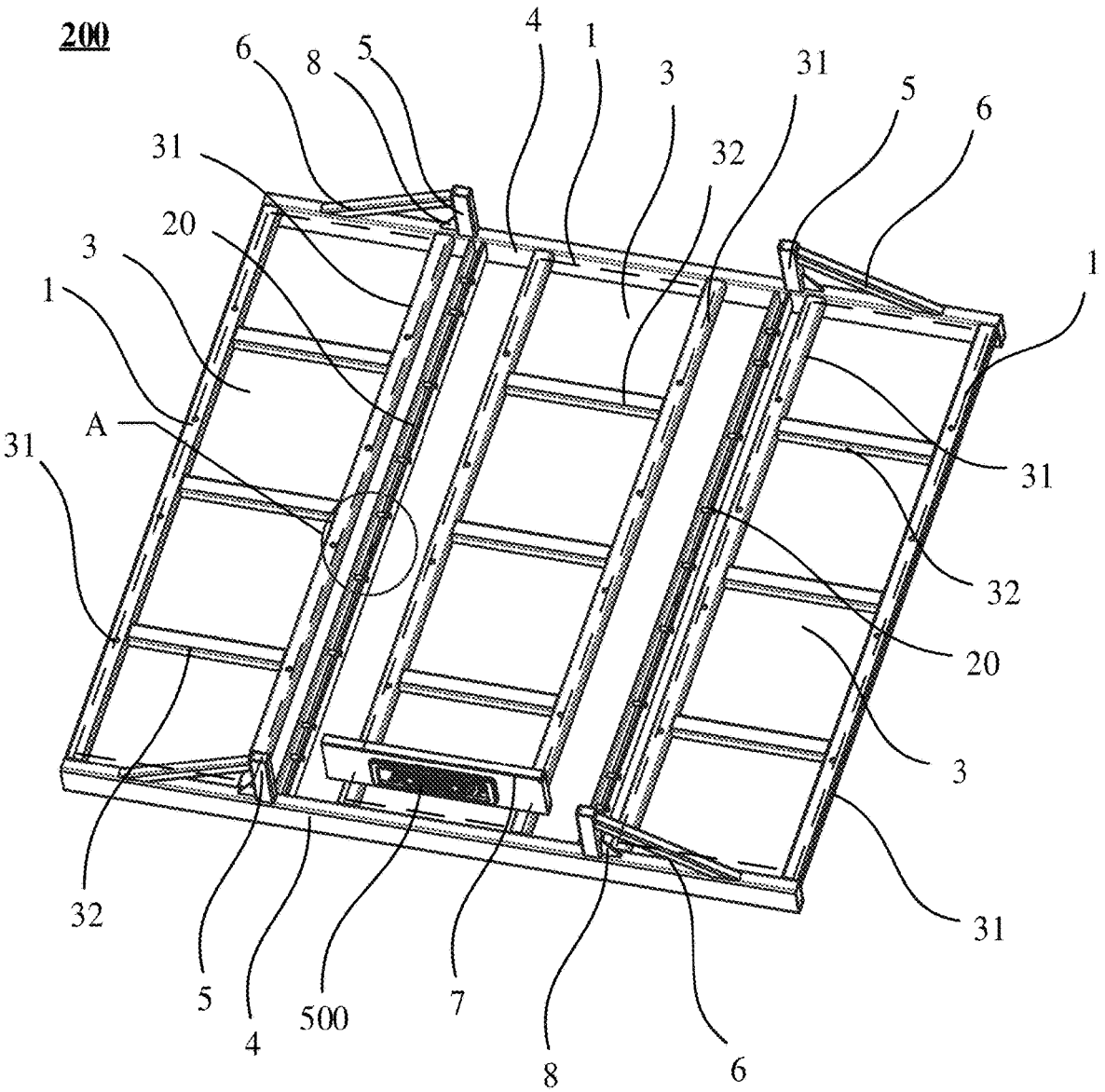
FIG. 3 is a structural schematic diagram of the battery pack tray in embodiment 1 of the invention.

The structure of the electric vehicle in this embodiment is basically the same as that of the electric vehicle in embodiment 1, and the main differences are as follows:

In this embodiment, the battery pack tray 200 further comprises a limiting structure, and the limiting structure comprises a stand column 5 and a limiting rod 6, wherein the stand column 5 is arranged on the fixing beam 4 at a position corresponding to the adjacent placing positions 1, a first end of the limiting rod 6 is connected with the stand column 5, and a second end of the limiting rod 6 is connected with the fixing beam 4 and extends to the outside of the sub-frame 3. When the battery pack 300 is placed in the sub-frame 3, the limiting structure is located at the outside of the battery pack 300, so that the battery pack 300 can be prevented from falling from the sub-frame 3, and at the same time, the limiting rod 6 plays a role in strengthening the structure at the fixing beam 4. In this embodiment, as shown in FIG. 3, there are four limiting rods 6, of which the second ends of two limiting rods 6 extend to the two sides of the first placing position 1 corresponding to the fixing beam 4, that is, the upper and lower sides of the first sub-frame 3 in FIG. 3, and the second ends of the other two limiting rods 6 extend to the two sides of the third placing position 1 corresponding to the fixing beam 4.

In order to further strengthen the structural strength of the connection position between the stand column 5 and the fixing beam 4, the connection position between the stand column 5 and the fixing beam 4 is provided with a reinforcing rib 8, in this embodiment, the reinforcing rib 8 is a triangular straight plate, and both sides of the reinforcing rib 8 are welded with the stand column 5 and the fixing beam 4 respectively, in other embodiments, the connection method of the reinforcing rib 8 with the stand column 5 and the fixing beam 4 is not limited to this example, but also can be plugging, clamping, etc., which will not be described repeatedly here.

The battery pack tray 200 further comprises a fixing plate 7, and the second electrical connector 500 is arranged on the fixing plate 7, which is located between the two fixing beams 4 along the length direction of the vehicle body longitudinal beam 100. Specifically, the fixing plate 7 is vertically arranged on the support beam 31. When the battery pack tray 200 is arranged on the vehicle body longitudinal beam 100 by means of the vehicle body bracket 700, the fixing plate 7 is used to provide a mounting position for the second electrical connector 500 and avoid the vehicle body bracket 700 in order to realize the docking of the first electrical connector 400 and the second electrical connector 500.

Embodiment 3

Figure 7:
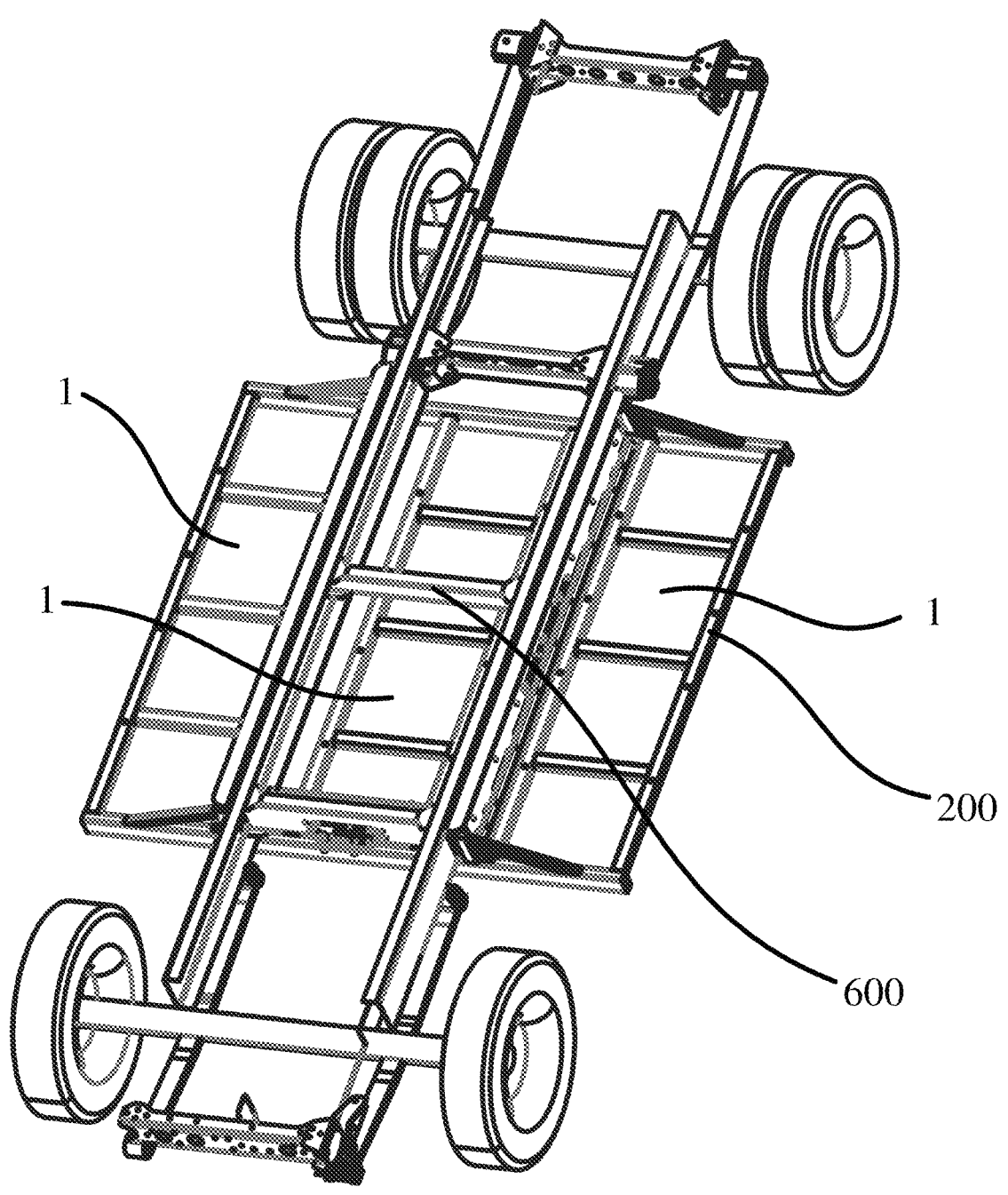
FIG. 7 is a partially structural schematic diagram (I) of the electric vehicle in embodiment 3 of the invention.

The structure of the electric vehicle in this embodiment is basically the same as that of the electric vehicle in embodiment 1, and the main differences are as follows:

Referring to FIG. 7, in this embodiment, there are also two vehicle body longitudinal beams 100, and a beam 600 is arranged between the two vehicle body longitudinal beams 100, but the beam 600 in this embodiment passes through the placing position 1 between the two vehicle body longitudinal beams 100. The battery pack 300 in the placing position 1, through which the beam 600 passes, between the two vehicle body longitudinal beams 100 is divided into two battery packs 300 by the beam 600, so that the battery packs 300 avoid the beam 600.

In other specific embodiments, the battery pack 300 in the placing position 1, through which the beam 600 passes, between the two vehicle body longitudinal beams 100, also can be provided with an avoidance part for avoiding the beam 600, for example, the battery pack 300 has an inwardly recessed through groove capable of accommodating the beam 600, which is used for avoiding the beam 600.

And the top of the battery pack 300 in the placing position 1, through which the beam 600 passes, between the two vehicle body longitudinal beams 100, is higher than the bottom of the vehicle body longitudinal beams 100, so as to fully utilize the space between the two vehicle body longitudinal beams 100, that is, to fully utilize the space at the lower part of the electric vehicle, and the top of the two battery packs 300 in the placing position 1 outside the two vehicle body longitudinal beams 100 is also higher than the bottom of the vehicle body longitudinal beams 100, so as to ensure that the electric vehicle has sufficient power.

In other embodiments, the top of the battery pack 300 in the placing position 1, through which the beam 600 passes, between the two vehicle body longitudinal beams 100, also can be higher than the bottom of the vehicle body bracket 700, which will not be described repeatedly here.

Embodiment 4

The electric vehicle in his embodiment is basically the same as the electric vehicle of any one of embodiments 1 to 3, the main differences are as follows:

In this embodiment, there are also two locking matching structures 20 of the battery pack tray 200, and the two locking matching structures 20 are located between the two vehicle body longitudinal beams 100, and the locking mechanisms 10 are arranged at the opposite sides of the vehicle body bracket 700, and the locking matching structures 20 are located between the two vehicle body longitudinal beams 100.

In other specific embodiments, the locking mechanism and the locking cooperation mechanism are not limited to this example, but also can be T-shaped locking mode or threaded locking mode, which will be briefly introduced below.

The First Type: T-Type Locking Mode

The locking mechanism comprises a locking base, which has a first opening extending in the vertical direction, a first threaded part is arranged within the first opening, the first threaded part is internal thread, the locking matching mechanism comprises a mounting seat and an unlocking rod, and a second opening extending in the vertical direction is arranged in mounting seat, and the unlocking rod is vertically arranged in the second opening, the unlocking rod can move in the vertical direction relative to the mounting seat and is provided with a second threaded part matched with the first threaded part, and the second threaded part can be matched with the second threaded part, thus realizing the locking and unlocking of the locking mechanism and the locking matching mechanism.

The Second Type: Thread Locking Mode

The locking mechanism comprises a locking seat with a first opening extending in the vertical direction, and a limiting part is arranged in the first opening; the first opening is a square hole, and the limiting part is formed by the above the first opening; the locking matching mechanism comprises an unlocking rod, the upper end of the unlocking rod is provided with a stopping part; the stopping part comprises a locking rod extending in the horizontal direction; the locking rod is cylindrical and horizontally arranged at the top of the unlocking rod; and the locking rod and the unlocking rod jointly form a T-shaped structure.

When the locking rod is at a first angle, the locking rod can pass through the first opening and enter the limiting part of the locking base; when the locking rod rotates to a second angle, the locking rod can be limited in the limiting part, so that the locking mechanism and the locking matching mechanism are relatively fixed.

By adopt that technical solution in the above embodiments, the height space below the longitudinal beam is fully utilized, and when the battery pack tray is disassemble by the battery swapping apparatus, the unloaded battery swapping apparatus can directly enter the space below the battery pack tray without interference with the bottom of the electric vehicle; when the battery pack tray is installed by battery swapping apparatus, the battery swapping apparatus carrying the battery pack tray and the battery pack can also directly enter the lower part of the longitudinal beam for battery swapping without interfering with the bottom of the electric vehicle. In the whole process, there is no need to lift the vehicle body, set a sinking space or dig a pit for battery swapping apparatus to enter and exit, which reduces the cost, time and difficulty of station construction, reduces the requirements for station construction site and improves the efficiency of battery swapping.

Although the specific embodiments of the present invention have been described above, those skilled in the art should understand that this is only an example, and the scope of protection of the present invention is defined by the appended claims. Those skilled in the art can make many changes or modifications to these embodiments without departing from the principle and essence of the present invention, but these changes and modifications all fall within the protection scope of the present invention.

What is claimed is:

1. A battery pack tray, used for installing a battery pack on a vehicle body longitudinal beam, wherein the battery pack tray comprises:

a frame body, at least two placing positions for placing the battery pack arranged at intervals in the horizontal direction and a locking matching structure are formed on the frame body, and at least one pair of adjacent placing positions is provided with the locking matching structure therebetween;

the locking matching structure comprises a horizontally arranged locking shaft and a first connecting plate and a second connecting plate extending along the length direction of the vehicle body longitudinal beam, and both ends of the locking shaft are respectively connected with the first connecting plate and the second connecting plate for cooperating with a locking mechanism on the vehicle body longitudinal beam to realize locking.

2. The battery pack tray according to claim 1, wherein the battery pack tray further comprises:

a second electrical connector for electrical connection with a first electrical connector on the vehicle body longitudinal beam, the second electrical connector is arranged on the frame body at a position corresponding to the first electrical connector, and the second connector is electrically connected to the battery pack;

there are at least three placing positions, and at least one placing position is located between the vehicle body longitudinal beams when the battery pack tray is installed on the vehicle body longitudinal beam.

3. The battery pack tray according to claim 2, wherein the frame body comprises a plurality of sub-frames arranged in parallel and fixed beams, the plurality of sub-frames are connected by the fixed beams, both of the first connecting plate and the second connecting plate are connected to the fixed beam, and the sub-frame forms the corresponding placing position.

4. The battery pack tray according to claim 3, wherein the locking matching structure further comprises a reinforcing plate, the first connecting plate, the reinforcing plate and the second connecting plate are sequentially connected to form a U-shaped structure, and the locking shaft is located in the opening of the U-shaped structure.

5. The battery pack tray according to claim 4, wherein a penetrating unlocking guide hole is arranged on the reinforcing plate at a position corresponding to a locking rod of the locking mechanism;

and/or, an upper end of the U-shaped structure is not higher than an upper end face of the sub-frame.

6. The battery pack tray according to claim 3, wherein a plurality of the placing positions are arranged along the width direction of the vehicle body longitudinal beam, and a plurality of the sub-frames are arranged in parallel to each other.

7. The battery pack tray according to claim 3, wherein the sub-frame comprises a supporting beam and a reinforcing beam connected to each other, and the battery pack is installed on the supporting beam and reinforcing beam;

preferably, there are two supporting beams, and the two supporting beams are arranged at intervals, and a reinforcing beam is arranged between the two supporting beams.

8. The battery pack tray according to claim 3, wherein there are two fixing beams, and both ends of the sub-frame, the first connecting plate and the second connecting plate are respectively connected with the two fixing beams.

9. The battery pack tray according to claim 8, wherein the battery pack tray further comprises a limiting structure, and the limiting structure comprises a stand column and a limiting rod, wherein the stand column is arranged on the fixed beam at a position corresponding to between of the adjacent placing positions, a first end of the limiting rod is connected with the stand column, and a second end of the limiting rod is connected with the fixing beam and extends to the outside of the sub-frame;

preferably, the connection position of the stand column and the fixing beam is provided with reinforcing ribs.

10. The battery pack tray according to claim 8, wherein there are two locking matching structures, and the number of placing positions on the side of the two locking matching structures far from the vehicle body longitudinal beam is equal, and the second electrical connector is located between the two locking matching structures;

preferably, the battery pack tray further comprises a fixing plate, and the second electrical connector is arranged on the fixing plate, and the fixing plate is located between two fixing beams along the longitudinal direction of the vehicle body longitudinal beam.

11. The battery pack tray according to claim 1, wherein there are a plurality of locking shafts, and the plurality of locking shafts are horizontally arranged at intervals along the longitudinal direction of the vehicle body longitudinal beam.

12. An electric vehicle, wherein the electric vehicle comprising a vehicle body longitudinal beam and the battery pack tray according to claim 1, the vehicle body longitudinal beam is provided with a locking mechanism, and the battery pack tray is detachably connected to the vehicle body longitudinal beam by means of the locking matching structure and the locking mechanism.

13. The electric vehicle according to claim 12, further comprising a vehicle body bracket, the vehicle body bracket is arranged on the vehicle body longitudinal beam and the locking mechanism is arranged on the vehicle body bracket;

preferably, the locking mechanism is provided with a through groove for the locking shaft to pass through, and the through groove is located below the vehicle body longitudinal beam or the vehicle body bracket.

14. The electric vehicle according to claim 13, wherein there are two locking matching structures of the battery pack tray, and the two locking matching structures are located between the two vehicle body longitudinal beams, and the locking mechanisms are arranged at opposite sides of the vehicle body bracket;

or, there are two locking matching structures of the battery pack tray, and the two locking matching structures are located outside the two vehicle body longitudinal beams, and the locking mechanisms are arranged at opposite sides of the vehicle body bracket.

15. The electric vehicle according to claim 12, wherein there are two vehicle body longitudinal beams, and a beam is arranged between the two vehicle body longitudinal beams, and the beam is located outside the battery pack tray.

16. The electric vehicle according to claim 12, wherein there are two vehicle body longitudinal beams, a beam is arranged between the two vehicle body longitudinal beams, and the beam passes through the placing positions between the two vehicle body longitudinal beams.

17. The electric vehicle according to claim 16, wherein a battery pack is arranged in the placing position of the battery pack tray, the battery pack in the placing position, through which the beam passes, between the two vehicle body longitudinal beams is provided with an avoidance part for avoiding the beam or is divided into a plurality of battery packs by the beam;

and/or, the top of the battery pack in the placing position, through which the beam passes, between the two vehicle body longitudinal beams is higher than the bottom of the vehicle body longitudinal beams or the vehicle body bracket.

* * * * *